United States Patent [19]
Noro

[11] Patent Number: 5,499,175
[45] Date of Patent: Mar. 12, 1996

[54] POWER SUPPLY CIRCUIT

[75] Inventor: Masao Noro, Hamamatsu, Japan

[73] Assignee: Yamaha Corporation, Japan

[21] Appl. No.: 53,103

[22] Filed: Apr. 26, 1993

[30] Foreign Application Priority Data

Apr. 27, 1992 [JP] Japan ..................... 4-134311

[51] Int. Cl.⁶ ................................. H02M 3/325
[52] U.S. Cl. ................... 363/16; 363/19; 363/132
[58] Field of Search ............... 363/16, 18, 19, 363/20, 49, 65, 97, 131, 17, 98, 132; 323/266

[56] References Cited

U.S. PATENT DOCUMENTS

| | | | |
|---|---|---|---|
| 4,274,133 | 6/1981 | Cuk et al. | 363/39 |
| 4,633,157 | 12/1986 | Streater | 318/723 |
| 4,679,129 | 7/1987 | Sakakibara et al. | 363/17 |
| 4,685,041 | 8/1987 | Bowman et al. | 363/40 |
| 4,785,387 | 11/1988 | Lee et al. | 363/21 |
| 4,814,962 | 3/1989 | Magalhaes et al. | 363/16 |
| 4,841,220 | 6/1989 | Tabisz et al. | 323/282 |
| 4,845,605 | 7/1989 | Steigerwald | 363/21 |
| 4,857,822 | 8/1989 | Tabisz et al. | 323/282 |
| 4,902,957 | 2/1990 | Cassani et al. | 323/222 |
| 4,950,974 | 8/1990 | Pagano | 323/222 |
| 4,956,760 | 9/1990 | Gulczynski | 363/16 |
| 5,048,033 | 9/1991 | Donahue et al. | 372/38 |
| 5,066,900 | 11/1991 | Bassett | 323/224 |
| 5,122,728 | 6/1992 | Ashley | 323/282 |
| 5,146,399 | 9/1992 | Gucyski | 363/89 |
| 5,164,656 | 11/1992 | Gulczynski | 323/222 |
| 5,164,892 | 11/1992 | Kimbara | 363/131 |
| 5,177,675 | 1/1993 | Archer | 363/25 |

Primary Examiner—Peter S. Wong
Assistant Examiner—Adolf Berhane
Attorney, Agent, or Firm—Graham & James

[57] ABSTRACT

A power supply circuit includes a DC—DC converter, a switching inverter circuit connected to an output terminal of the DC—DC converter and an output circuit for rectifying and smoothing an output of the switching inverter circuit to provide a dc output. The DC—DC converter has a first inductance element inserted in series in at least one of an input terminal and an output terminal, and a second inductance element inserted between a reference potential terminal. The switching inverter circuit includes a switching circuit including an on-off controllable switching element for switching an input voltage to convert it to ac and outputting it, a current resonance circuit formed in series to current flowing to an output terminal of the switching circuit, a voltage resonance circuit formed in parallel to voltage produced at the output terminal of the switching circuit, and a timing control circuit for turning off the switching element of the switching circuit when its main current is zero and turning on the switching element when voltage across the switching element is zero.

8 Claims, 15 Drawing Sheets

POWER SUPPLY CIRCUIT

BACKGROUND OF THE INVENTION

This invention relates to a switching inverter type power supply circuit utilizing resonance.

A conventional dc power supply circuit generally employs a large power transformer with a commercial ac power supply source being connected to its primary winding and a secondary winding side output being rectified and smoothed. Aside from this dc power supply circuit, there are small and light power supply circuits called switching power supply circuits. These switching power supply circuits include switching inverter power supply circuits of a half-bridge type, a full-bridge type and a push-pull type using switching elements such as a transistor and a thyristor.

The conventional switching inverter type power supply circuits, however, produce switching noises because a square wave is used for both operation current and operation voltage. Besides, since these power supply circuits are operated fundamentally at a high frequency, a considerable power loss and resulting heating occur during recovery time of a rectifying diode and a turn-off time of switching transistor.

In the field of the switching power supply circuits, there have been proposals (e.g., Japanese Patent Application Laid-open No. Sho 64-43062 and Japanese Patent Application Laid-open No. Hei 1-91659) to reduce noise and improve efficiency by causing a current waveform or voltage waveform to simulate a sinusoidal wave by utilizing resonance.

In the proposed resonance type switching power supply circuits, however, setting of on-off timings is rather difficult and, when this setting is insufficient, desired improvement of efficiency cannot be achieved. Besides, the proposed resonance type power supply circuits cause either a current waveform or a voltage waveform only to simulate a sinusoidal wave by resonance. Considering that noises produced by the switching circuits include both noises occurring due to voltage and noises occurring due to current, noise reduction obtainable by these switching circuits has apparently certain limitation.

It is, therefore, an object of the invention to provide a switching inverter type power supply circuit of a high efficiency and low noise.

SUMMARY OF THE INVENTION

For achieving the object of the invention, there is provided a power supply circuit of four-channel circuit type having input terminal, an output terminal and a reference potential terminal comprising a first inductance, one end of which is connected to the input terminal, a second inductance, one end of which is connected to the reference potential terminal, a DC—DC converter circuit connected to the other end of the first inductance through an input side of the converter circuit and connected to the other end of the second inductance through a reference potential side thereof, a switching inverter circuit connected to the output of said DC—DC converter circuit, said switching inverter circuit comprising, switching means including switching elements capable of switching an input from the DC—DC converter to convert the input to ac and outputting ac from an output terminal thereof, the ac changing between two different potentials, series resonance means provided in series to current flowing from the output terminal of the switching means, the series resonance means being capable of generating resonance current, parallel resonance means provided in parallel to voltage produced at the output terminal of the switching means, the parallel resonance means being capable of generating resonance voltage and potential at the output terminal of the switching means being converted from one of the two different potentials to the other by using the parallel resonance voltage of the parallel resonance means, and switching control means for controlling the switching elements of the switching means so as to intermittently turn on the switching elements, an dc output means for rectifying and smoothing an output of said switching inverter circuit, the dc output means being capable of taking out a dc output from the resonance current of the series resonance means, whereby all switching operations of the switching elements of the switching means are performed substantially at a voltage zero state or substantially at a current zero state and harmonic contents in operation voltage and operation current in the power supply circuit are reduced.

According to the invention, discontinuity in the output current accompanying switching in the former stage DC—DC converter is eliminated owing to the operating of the first and second inductance elements whereby a continuous current mode is brought about and noise is thereby reduced.

In the post stage switching inverter circuit connected to the DC—DC converter, both current resonance and voltage resonance are utilized so that both the current waveform and the voltage waveform become a sinusoidal wave and the switching element is turned off at a current zero state whereas it is turned on at a voltage zero state. This remarkably reduces a loss in the switching element with a result that a high efficiency is achieved. A switching noise is also reduced remarkably and unnecessary radiation such as harmonics is sufficiently reduced.

Therefore, according to the invention, a switching power supply circuit of a high efficiency and low noise can be obtained.

Embodiments of the invention will now be described with reference to the accompanying drawings.

BRIEF DESCRIPTION OF THE DRAWINGS

In the accompanying drawings.

DESCRIPTION OF PREFERRED EMBODIMENTS

Figure 1:
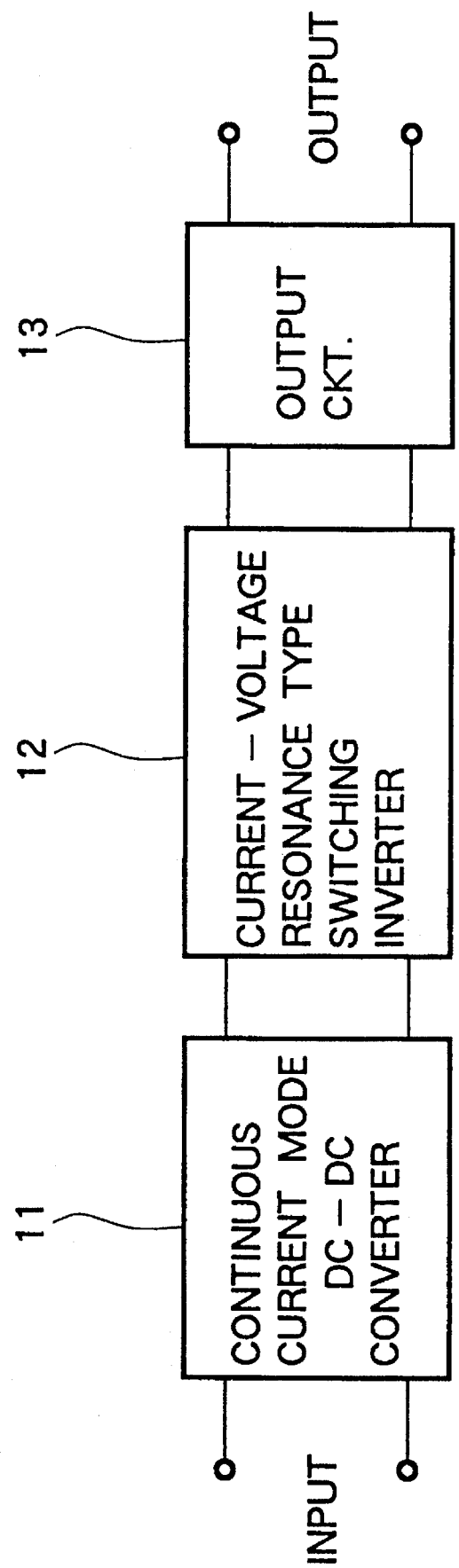
FIG. 1 is a block diagram showing an outline of an embodiment of the power supply circuit according to the invention.

FIG. 1 is a diagram schematically showing an outline of an embodiment of the power supply circuit according to the invention.

As illustrate, this power supply circuit comprises, in its former stage, a continuous current mode DC—DC converter 11 and, in its post stage, a current-voltage resonance type switching inverter circuit 12 for converting the output of the converter 11 to ac and an output circuit 13 for rectifying and smoothing the output of the switching inverter circuit 12. The DC—Dc converter 11 is made, as will be described more fully later, by adding an inductance element to a conventional converter so that its output current will become a continuous mode. The switching inverter circuit 12 is, as will also be described more fully later, a resonance type inverter utilizing both current resonance and voltage resonance.

Figure 2:
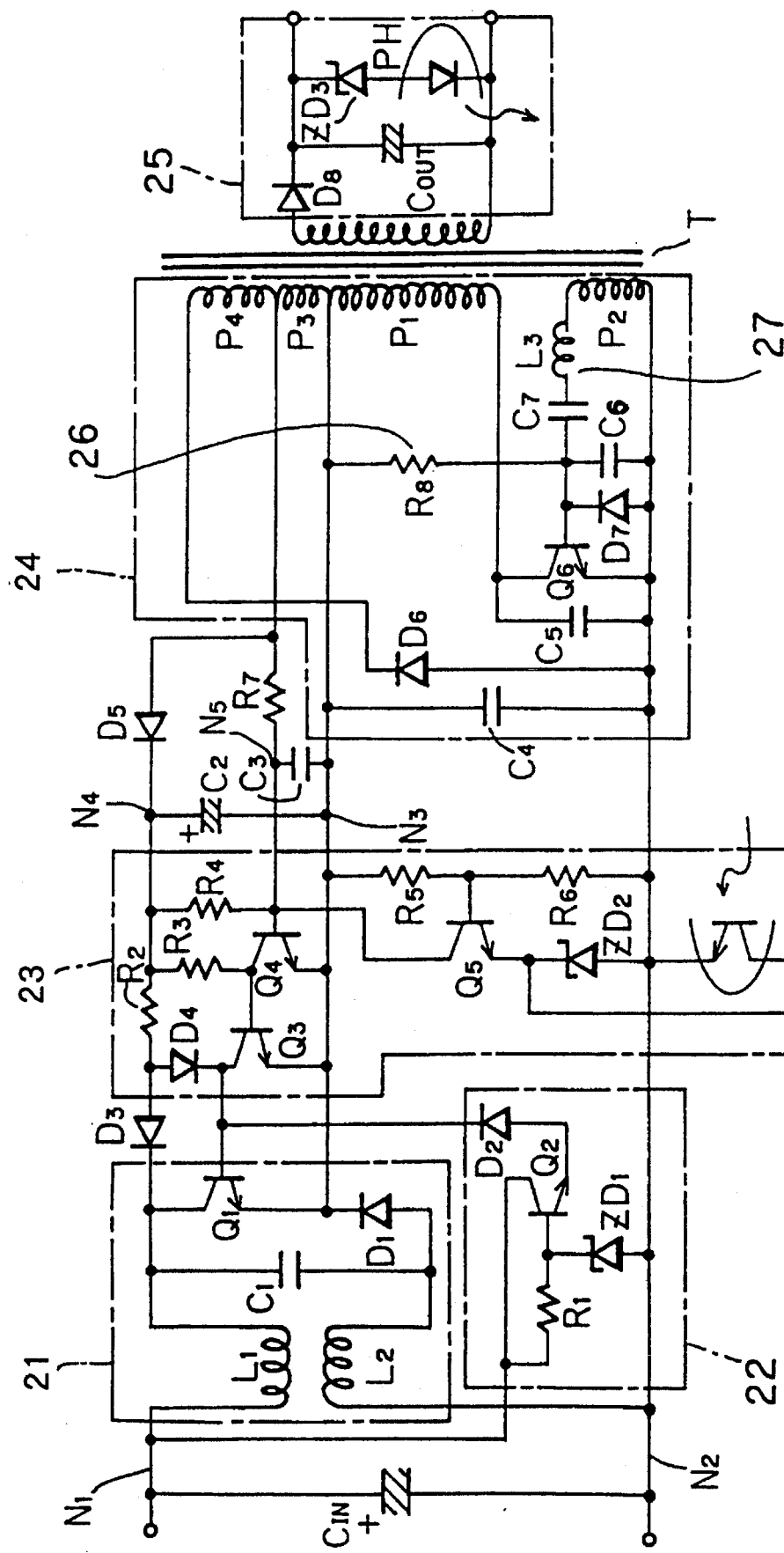
FIG. 2 is a circuit diagram showing a specific example of the power supply circuit of this embodiment.

FIG. 2 is a circuit diagram showing a specific structure of the power supply circuit of FIG. 1. A continuous current mode DC—DC converter 21 includes a basic circuit in which a capacitor C1 is connected in parallel to a series circuit of an NPN transistor Q1 constituting a switching element and a diode D1. To an input terminal N1 thereof is connected a first inductance element L1 and a second inductance element L2 is connected between a node between the diode D1 and the capacitor C1 and a reference terminal N2. In this embodiment, the first and second inductance elements L1 and L2 are wound on a single, common core and therefore are made integral with each other.

A first starting circuit 22 is a circuit which, when an input dc voltage (e.g., dc voltage obtained by rectifying commercial AC power supply by a rectifying circuit) is supplied to the converter 21, starts the transistor Q1 constituting the switching element. The first starting circuit 22 is made of an NPN transistor Q2 whose collector is connected to the input terminal N1 and whose emitter is connected through a diode D2 to the base of the transistor Q1 of the converter 21, a Zener diode ZD1 and resistance R1.

To an output terminal N3 of the DC—DC converter 21 is connected a current-voltage resonance type switching inverter circuit 24 receiving the output of the DC—DC converter 21. This switching inverter circuit 24 comprises an NPN transistor Q6 constituting a switching element, a second starting circuit 26 consisting of resistance R8 connected between the base of the transistor Q6 and the terminal N3 and a timing control circuit 27 consisting of an inductance element L3 and a capacitor C7 and controlling the on-off timing of the transistor Q6.

Figure 3:
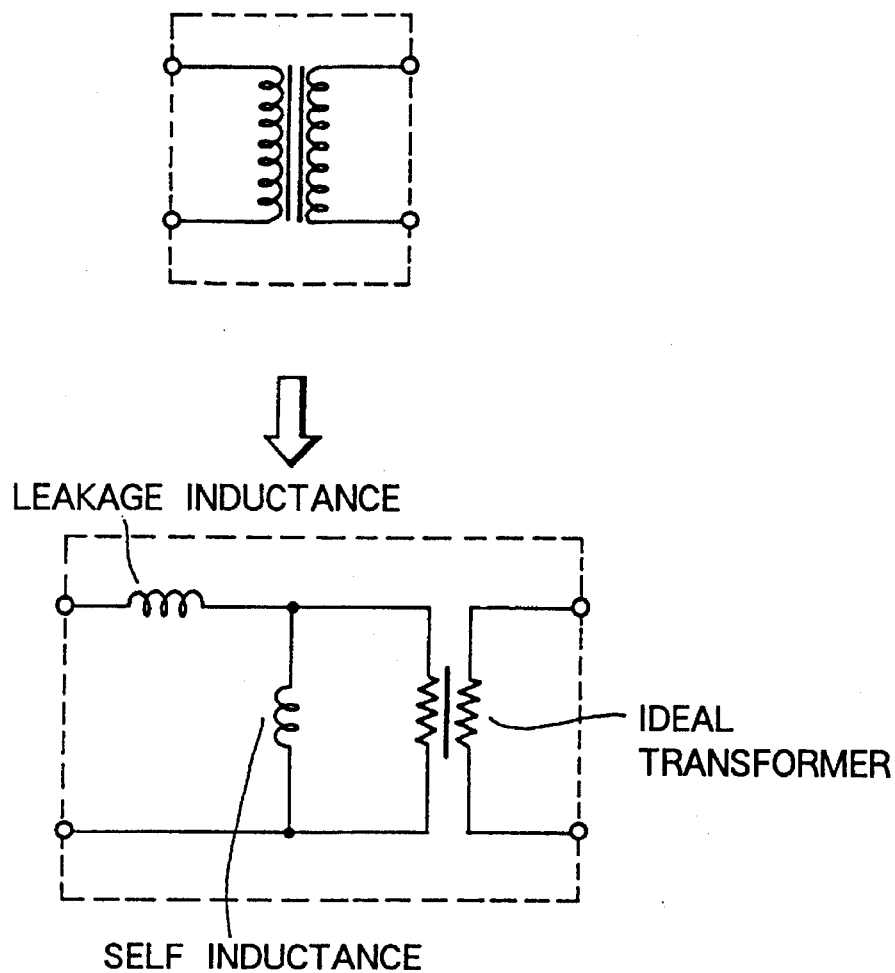
FIG. 3 is a diagram showing an equivalent circuit of a transformer.

A capacitor C4 provided between the terminal N3 and the reference terminal N2 and leakage inductance of an output transformer T constitute a current resonance circuit (serial resonance circuit) which is connected in series to the output current of the inverter whereas self inductance of a capacitor C5 connected between the collector and emitter of the transistor Q6 and self inductance of a primary winding tap P1 of the transformer T constitute a voltage resonance circuit (parallel resonance circuit) which is connected in parallel to the output voltage of the inverter. As illustrated in FIG. 3, the transform T can be expressed by an ideal transformer, leakage inductance and self inductance and the leakage inductance and self inductance are utilized respectively as the current resonance circuit and the voltage resonance circuit.

A capacitor C6 and a diode D7 provided between the base and emitter of the transistor Q6 are respectively used for adjusting timing and protection from overvoltage.

An additional tap P4 is provided on the primary winding of the output transistor T and a diode D6 for clamping is connected between the tap P4 and the reference terminal N2.

To the output terminal N3 of the DC—DC converter 21 is connected a pulse-width modulation (PMW) circuit 23 which controls on-period and off-period of the NPN transistor Q1 which is the switching element of the DC—DC converter 21. The PWM circuit 23 comprises, as a basic portion thereof, a drive circuit section including NPN transistors Q3 and Q4, resistances R2, R3 and R4 and a diode D4. This drive circuit section is controlled by a dc voltage at a terminal N4 which is obtained by rectifying an ac voltage provided from the tap P3 of the transformer T by a diode D5 and smoothing it by a capacitor C2 and a triangular waveform voltage at a terminal N5 which is obtained by integrating, by an integration circuit consisting of resistance R7 and a capacitor C3, voltage provided from the primary winding tap P3.

The voltage at the terminal N4 is supplied through the resistance R2 and diode D3 to the collector of the switching transistor Q1 of the converter 21 and also is supplied through the resistance R2 and diode D4 to the base of the switching transistor Q1. These diodes D3 and D4 are provided for enabling the switching transistor Q1 of the converter 21 to operate constantly in an unsaturated region.

The PWM circuit 23 comprises also a control circuit section including an NPN transistor Q5, a Zener diode ZD2 and resistances R5 and R6 for controlling the transistor Q4 of the drive circuit section in accordance with the voltage at the terminal N3.

The output of the switching inverter circuit 24 is coupled to the output circuit 25 through the output transformer T. In this present embodiment, the number of winding n1 of the primary winding and the number of winding n2 of the secondary winding have a relation of n1>n2. Alternatively stated, the primary side has a high-voltage small-current characteristic and the secondary side has a low-voltage large current characteristic. In the present embodiment, the output circuit 25 comprises a rectifying diode D8 and a smoothing capacitor COUT and, additionally, a Zener diode ZD3 and a photo-coupler PH for detecting an excessive output voltage and performing a feedback control. The light emitting section of the photo-coupler PH is connected in series to the Zener diode ZD3 between two output terminals and the light receiving transistor section is connected between the emitter of the transistor Q5 of the PWM circuit 23 and the reference terminal N2 so as to short-circuit the Zener diode ZD2. By this arrangement, when the secondary side output voltage has exceeded a set value, feedback is applied to the PWM circuit 23 so as to reduce the output voltage.

The current resonance capacitor C4 is exposed directly between the input terminals of the switching inverter circuit 24. Whatever circuit may be connected to the input side of the circuit 24, isolating means for preventing interference of other circuits to the current resonance capacitor C4 is required. In this embodiment, the first inductance element L1 constituting the former stage DC—DC converter 21 concurrently performs the function of the inductance element for preventing interference to the current resonance means of the switching inverter circuit 24. This inductance element has a sufficiently large impedance in a region of resonance frequencies determined by the current resonance capacitor C4 and thereby prevents the current resonance capacitor C4 from substantially coupling with other impedance component in the former stage. This concurrent use of the inductance element is made feasible by the fact that the resonance circuit of the switching inverter circuit 24 of this embodiment is provided on the primary side of the transformer T and that the value of the inductance element L1 of the DC—DC converter 21 provided for elimination of ripples is suitable for exhibiting impedance which is sufficiently large for separating the resonance means from other impedance at a resonance frequency of the switching inverter 24.

An outline of operation of the power supply circuit of FIG. 2 will now be described.

When an input voltage is applied between the terminals N1 and N2, the first starting circuit 22 is operated to start the DC—DC converter 21. More specifically, when an input voltage is supplied, the transistor Q2 of the first starting circuit 22 is turned on by bias which is determined by the resistance R1 and the Zener diode ZD1 and voltage determined by the diode D2 is applied to the base of the transistor Q1. The potential at the output terminal N3 of the converter 21 thereby rises.

As the voltage at this output terminal N3 has risen to a predetermined value, the base bias is supplied to the transistor Q6 by the second starting circuit 26, i.e., the resistance R8 of the switching inverter circuit 24 whereby oscillation is started by the tap P2 of the transformer. The oscillation frequency is determined by the time constant of an inductance element L3 and a capacitor C7 constituting the timing control circuit 27. At this time, values of inductance of the transformer T and the capacitors C4 and C5 are set at optimum values so that both voltage resonance and current resonance will take place. The operation of the switching inverter circuit 24 utilizing the voltage resonance and current resonance will be more fully described later.

When the on-off operations of the transistor Q6 have started, voltage obtained at the tap P3 of the transformer T is rectified by the diode D5 and smoothed by the capacitor C2. In other words, voltage at the terminal N4 is provided as power voltage of the PWM circuit 23. The voltage at the tap P3 is converted to a triangular waveform by the integration circuit consisting of the resistance R7 and the capacitor C3 and voltage at the terminal N5 of the integration circuit is supplied to the base of the transistor Q4.

To the base of the transistor Q4 is supplied base bias from the resistance R4 through the terminal N4. The values of the resistances R4 and R7 are set so that the transistor Q4 is constantly on when the transistor Q5 is off. When the transistor Q4 is turned on, the transistor Q3 is turned off and the transistor Q1 of the comparator 21 is turned on.

When the output terminal N3 of the converter 21has reached a predetermined voltage, the transistor Q5 is turned on by the resistances R5 and R6, and the Zener diode ZD2 and this results in decreasing the base potential of the transistor Q4. Therefore, due to the relation between potentials at the terminals N5 and N3, pulse-width modulation is performed for controlling the on period of the transistor Q1 of the converter 21 and the potential at the terminal N3 thereby is stabilized.

Since the first starting circuit 22 should not function after the voltage at the output terminal N3 of the converter 21 has been stabilized by the pulse-width modulation, the first starting circuit 22 automatically stops its function. In the present embodiment, constant voltage VD of the Zener diode ZD1 determining the base bias of the transistor Q2 is set at a value which is lower than the stabilized voltage at the output terminal N3 of the converter 21 whereby the first starting circuit 22 stops interference to the circuit operation upon entering the voltage stabilizing operation.

The output of the switching inverter 24 is coupled to the output circuit 25 by the transformer T and delivered out of the output circuit after being rectified and smoothed. When the secondary side output voltage has exceeded a predetermined value, the Zener diode ZD3 is turned on and the photo-coupler PH thereby is brought into operation to apply feedback to the PWM circuit 23. Since the light receiving transistor of the photo-coupler PH is connected in parallel to the Zener diode ZD2 provided at the emitter of the transistor Q5 of the PWM circuit 23, the transistor Q5 is forwardly biased when the light receiving transistor is turned on. As the transistor Q5 is turned on, the transistor Q4 whose base potential is reduced is turned off and the transistor Q3 is turned on. The transistor Q1 of the converter 21 thereby is turned off. By the PWM control by the feedback control, voltage at the output terminal N3 of the converter 21 is corrected to a lower value.

At this time, the constant voltage of the Zener diode ZD2 is set at a value which is lower than the voltage at the terminal N3 which is ultimately in operation.

The structure and operation of each part of the embodiment of FIG. 2 will now be described.

Figure 4A:
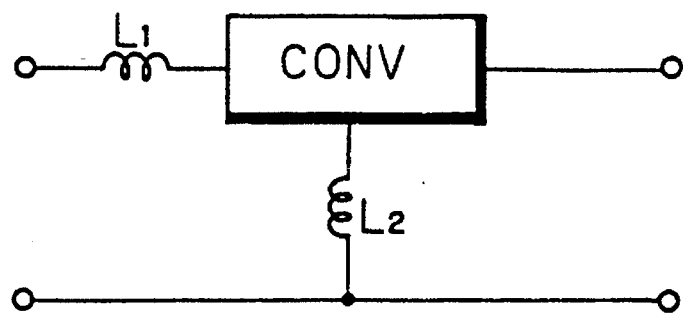
FIGS. 4A and 4D are diagrams showing examples of a continuous current mode DC—DC converter.
Figure 4B:
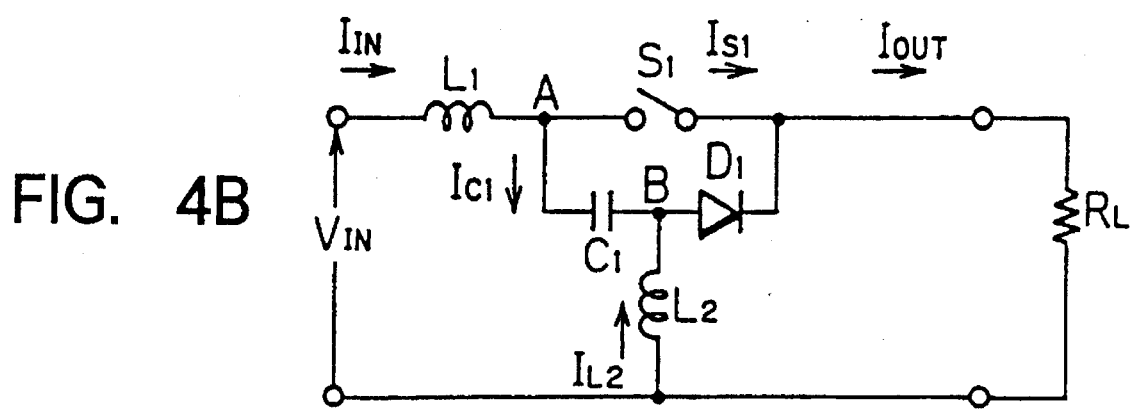
Figure 4C:
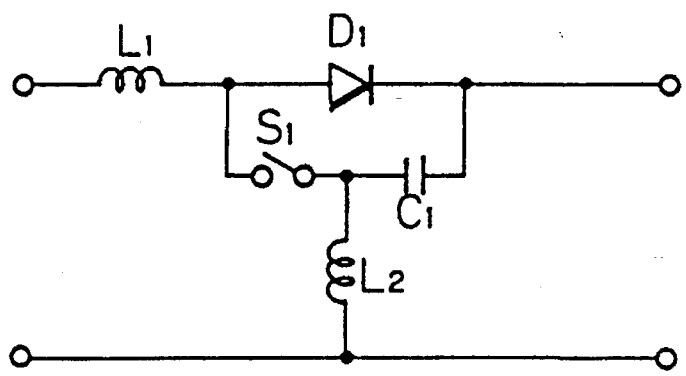
Figure 4D:
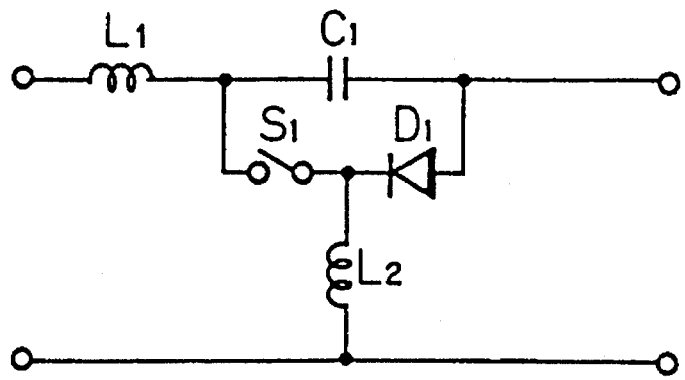

Replacing the continuous current mode converter 21 used in the embodiment of FIG. 2 by a four-terminal circuit, it can be expressed as shown in FIG. 4A. In this circuit, the first inductance element L1 is inserted in series to the input terminal of the converter circuit main body and the second inductance element L2 is inserted between the converter circuit and the reference terminal. FIGS. 4B to 4D show the converter circuit main body specifically. FIG. 4B shows a circuit in which a switching element S1 is connected in parallel to a series circuit of the capacitor C1 and the diode D1. This circuit is one shown in FIG. 2. FIG. 4C shows a circuit in which the diode D1 is connected in parallel to a series circuit of the switching element S1 and the capacitor C1. FIG. 4D shows a circuit in which the capacitor C1 is connected in parallel to a series circuit of the switching element S1 and the diode D1. These circuits also are equivalent to the circuit of FIG. 4B and the circuit of the present embodiment can be replaced by any of these circuits.

Figure 6:
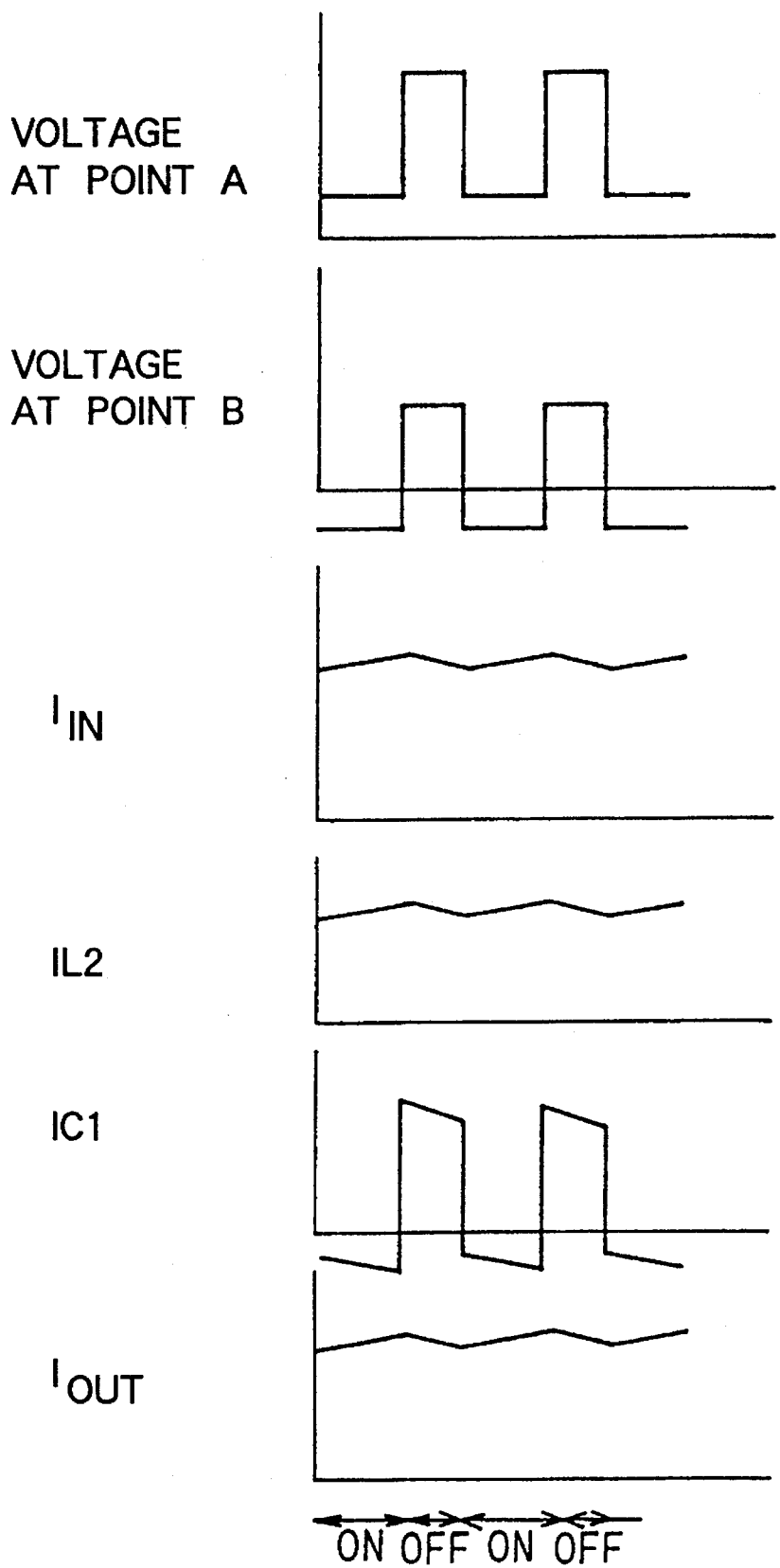
FIG. 6 is a diagram showing an operation waveform of the continuous current mode DC—DC converter.

The operation of the continuous current mode DC—DC converter will be described with respect to the circuit of the embodiment of FIG. 2, i.e., the circuit of FIG. 4B, and in conjunction with FIG. 6 which shows voltage and current waveforms of respective portions in the circuit of FIG. 4B.

Impedance of the capacitor C1 is assumed to be sufficiently small at the switching frequency. By turning on and off the switching element S1 under this condition, an output current IOUT is obtained alternately through the switching element S1 when the switching element S1 is on and through the diode D1 when the switching element S1 is off. The current flowing to the diode D1 at this time is supplied from the second inductance element L2 and the capacitor C1 but dc current is supplied only from the second inductance element L2 so that the value of the output current IOUT becomes current IL2 of the second inductance element L2.

When the switching element S1 is turned on, current IL1 flowing to the first inductance element L1 (equivalent to input current IIN) flows to the output side. Since the diode D1 is reversely biased at this time and is in an off state, the current IL2 flowing to the second inductance element L2 flows to the output side through the capacitor C1 and the switching element S. The output current IOUT therefore becomes $$IOUT=IL1+IL2.$$

When the switching element S1 is turned off, the diode D1 is turned on and the current IL2 flowing to the second inductance element L2 flows to the output side through the diode D2. The current IL1 flowing through the first inductance element L1 at this time flows also to the output side through the diode D1 since the switching element S1 is off. The output current at this time therefore becomes $$IOUT=IL1+IL2.$$

In this manner, in this DC—DC converter, the output current IOUT becomes a continuous mode. The current IC1 to the capacitor C1 alternates and voltage across the capacitor C1 becomes substantially equal to input voltage VIN.

In this circuit, voltage across the switching element S1 and the diode D1 is equal to the input voltage VIN at the maximum and its current is equal to the current IOUT. This is the same the conventional BUCK type converter. Since this circuit can use duty up to 100%, this circuit has all advantages of the BUCK type converter.

Figure 7A:
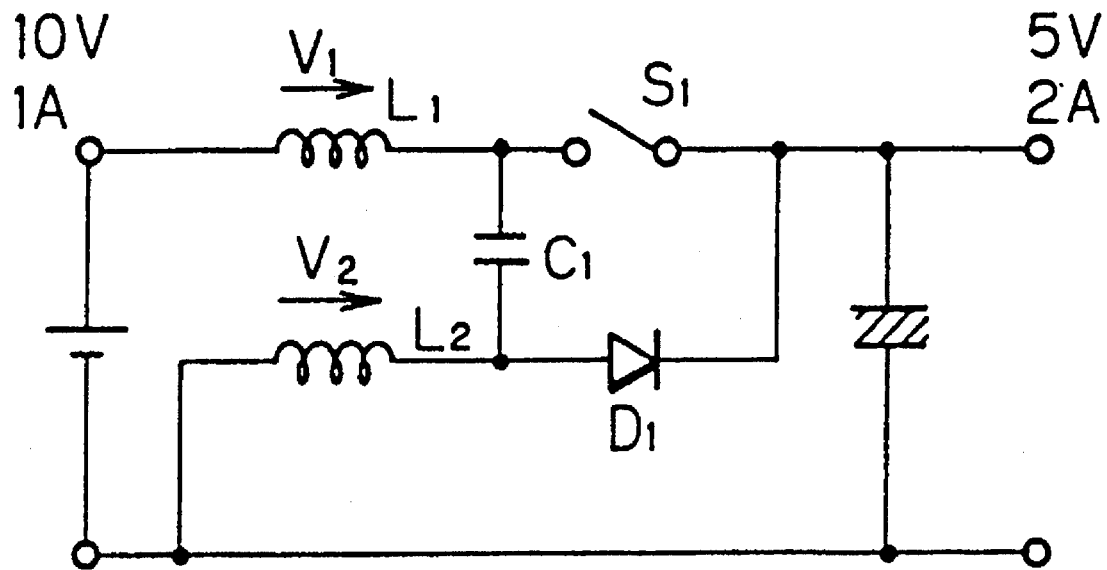
FIGS. 7A and 7B are diagrams for explaining sharing of a core commonly by inductance elements.
Figure 7B:
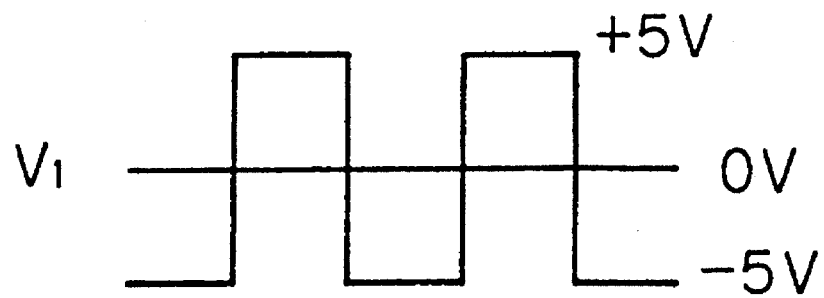
Figure 7B:
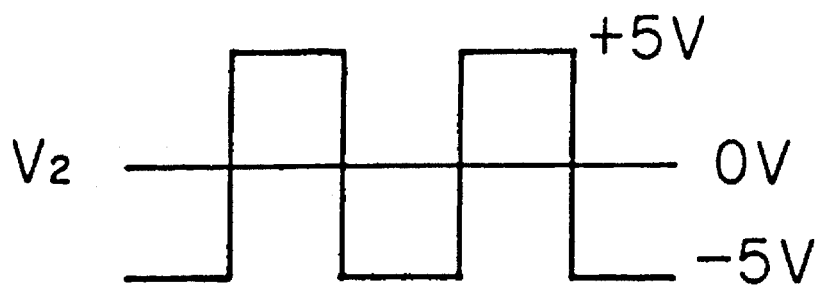

In the circuit of FIG. 4B, the voltage across the first inductance element L1 is always equal to the voltage across the second inductance element L2. This state is shown in FIGS. 7A and 7B. FIGS. 7A and 7B show an example in which 10 V, 1A is converted to 5 V, 2A. In this case, voltage V1 across the first inductance element L1 and voltage V2 across the second inductance element L2 oscillate as illustrated in FIG. 7B. These inductance elements L1 and L2 can therefore be made integral by winding them on a single core and FIG. 2 shows this integrated structure.

Figure 5A:
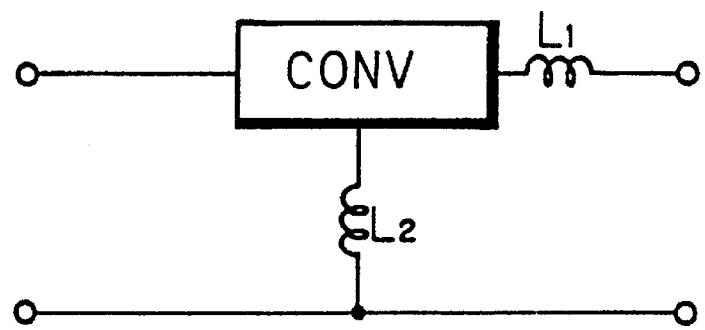
FIGS. 5A to 5D are diagrams showing examples of a continuous current mode DC—DC converter.
Figure 5B:
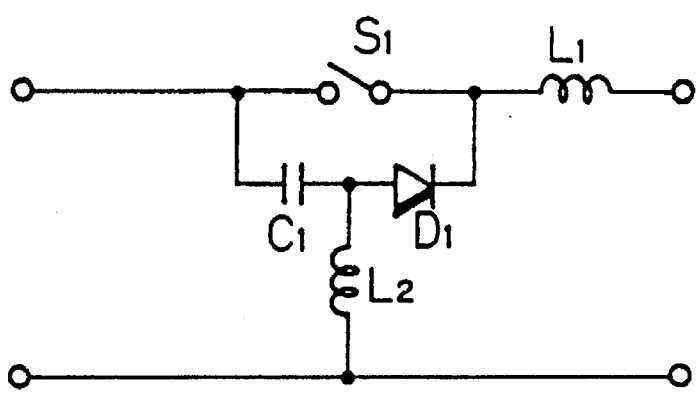
Figure 5C:
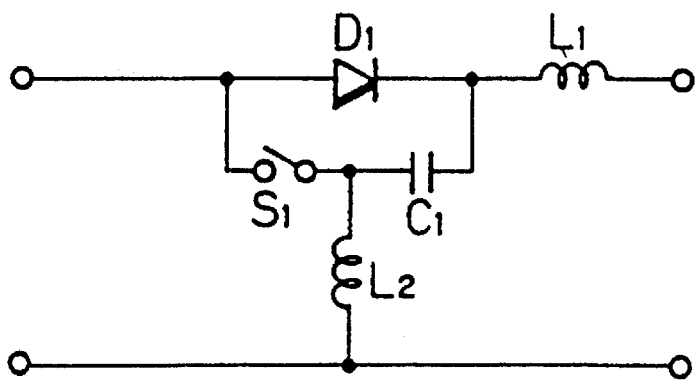
Figure 5D:
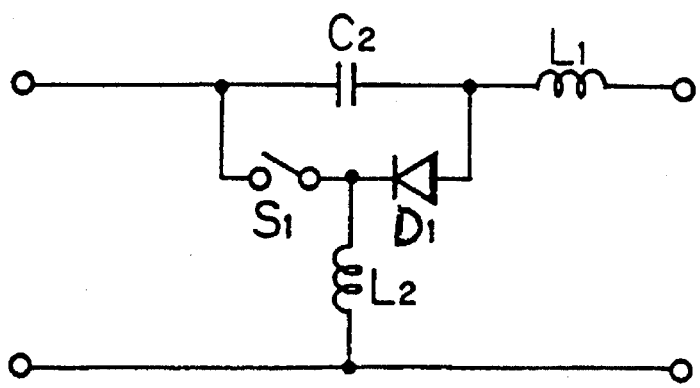

Aside from the circuit of FIG. 4B, in the circuit of FIG. 5B also, the first and second inductance elements L1 and L2 can be wound on a common core for the same reason.

Figure 8:
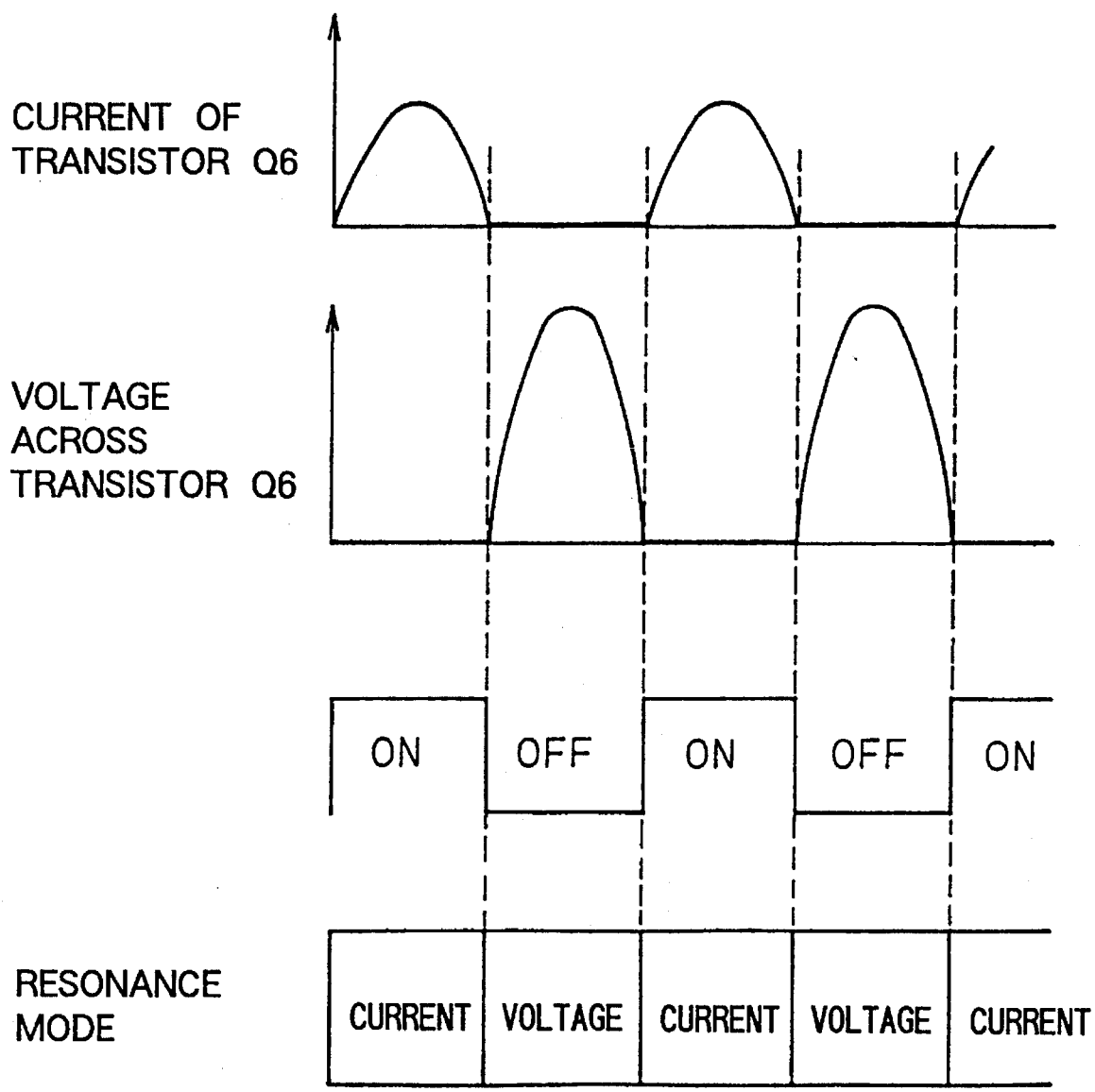
FIG. 8 is a diagram showing an operation waveform of a switching inverter circuit.

The operation of the switching inverter circuit 24 of FIG. 2 will be described in detail with reference to FIG. 8. When, as described previously, the converter 21 has been started and voltage has been obtained at the terminal N3, the switching inverter circuit 24 is caused to start its operation by the second starting circuit 26 and converts obtained output voltage to ac. Upon turning on of the transistor Q6, current flows to the transistor Q6. At this time, the series resonance circuit due to the capacitor C4 and the leakage inductance of the transformer T is brought into operation and a sinusoidal waveform oscillation current as shown in FIG. 8 is obtained. At a point where the main current of the transistor Q6 becomes substantially zero, this transistor Q6 is turned off. Upon turning off of the transistor Q6, the parallel resonance circuit due to the capacitor C5 and the self inductance of the tap P1 of the transformer T is brought into operation and the voltage across the transistor Q6 becomes a sinusoidal waveform as shown in FIG. 8. The transistor Q6 is turned off at a point where the voltage across it becomes substantially zero.

Time constants of the serial resonance circuit (current resonance circuit), parallel resonance circuit (voltage resonance circuit) and time control circuit 27 are determined in such a manner that the transistor Q6 is turned off at a point where its current is substantially zero and is turned on at a point where the voltage across it is substantially zero. As a result, both the current waveform and the voltage waveform in this switching inverter circuit 24 become a sinusoidal wave and an ac output free from harmonic components can thereby be obtained.

Beside, the base current of the transistor Q6 becomes homologous to the collector resonance current waveform owing to the LC resonance whereby a high efficiency can be achieved. The capacitor C6 provided between the base and emitter of the transistor Q6 enables a turnoff current to be secured by making the base voltage negative when the transistor Q6 is turned off whereby a high speed turnoff can be achieved.

In the foregoing manner, according to the above described embodiment, the former DC—DC converter 21 is in the continuous current mode so that noise is reduced. Since the post stage switching inverter circuit 24 is turned on and off at voltage zero and current zero states by the current resonance and voltage resonance, noise is reduced in this portion also. As a result, a low noise switching power supply circuit as a whole can be obtained. In the switching inverter circuit 24, the transistor Q6 which is the switching element is turned on and off at voltage zero and current zero states and, therefore, a high efficiency power supply circuit with little loss and heating can be obtained.

In the switching inverter circuit 24 of this embodiment, the voltage resonance circuit and current resonance circuit are provided on the primary side of the transformer T. A small type switching power supply circuit generally has, as the present embodiment has, a high voltage and a small current on the primary side and a low voltage and a large current on the secondary side. In this case, if a current resonance circuit utilizing leakage inductance of a transformer is provided on the secondary side, the capacity of the capacitor will become large because leakage inductance as viewed from the secondary side is smaller than leakage inductance as viewed from the primary side due to the winding ratio. Moreover, since the leakage inductance is affected in proportion to a square of the winding ratio, if the leakage inductance on the secondary side of the transformer is utilized, the capacity of the current resonance capacitor C4 will become a large value of, e.g., 10 μF. As a capacitor used for current resonance, a film capacitor, for example, is desirable from the standpoints of ripple current characteristics, high frequency characteristic or aging. A film capacitor of such a large capacity will however require a very large size. A chemical capacitor of such a capacity can be of a relatively small size but its ripple current and high frequency characteristics are inferior to the film capacitor and besides a chemical capacitor is seriously affected by aging so that a chemical capacitor cannot be used for this purpose. In contrast thereto, by providing the current resonance circuit utilizing the leakage inductance on the primary side, necessary resonance capacity becomes large because the leakage inductance is large and, moreover, since the operation condition is one of a high voltage and small current, a film capacitor can be used properly as the current resonance capacitor C4. By this arrangement, Q in resonance can be made large and the power supply circuit as a whole can be manufactured in a small size.

Figure 9:
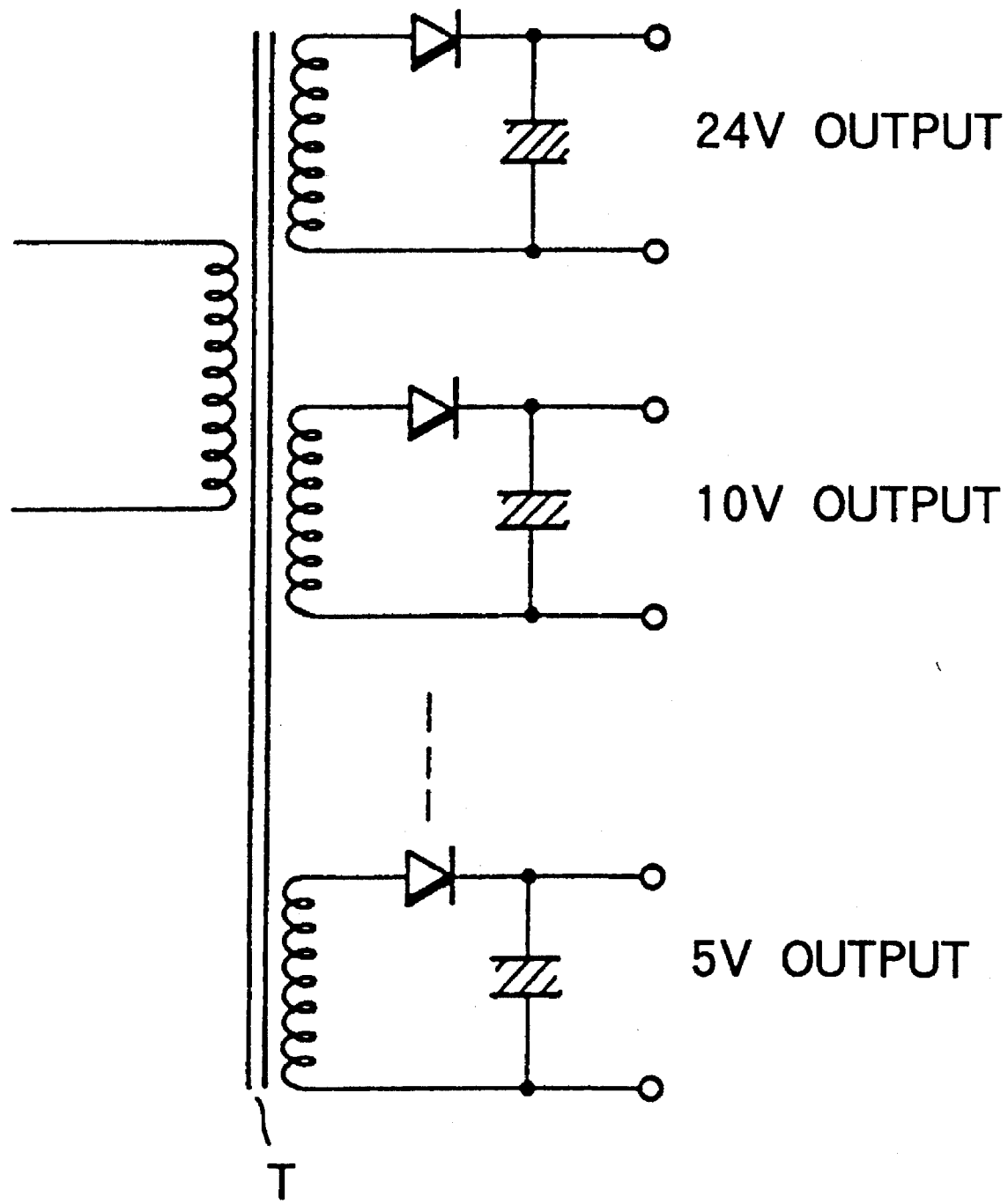
FIG. 9 is a diagram showing a multiple output power supply source.

Further, in this embodiment, the first inductance L1 provided in the former stage DC—DC converter is used as an interference preventing inverter element for preventing interference of the current resonance circuit of the switching inverter circuit with other circuits. This is realized by the provision of the current resonance circuit on the primary side in the switching inverter circuit 24 of this embodiment. This is very advantegeous when a multiple output power supply circuit as shown in FIG. 9 is constructed. If the multiple output power supply circuit as shown in FIG. 9 is constructed by providing the current resonance circuit on the secondary side, an interference preventing and smoothing inductance will be required for each output circuit on the secondary side and this will become an obstruction to design of a compact switching power supply circuit. According to the present embodiment, therefore, design of a compact power supply circuit can be realized when a multiple output power supply circuit is required.

The embodiment of FIG. 2 is a one-transistor type circuit in which the switching inverter circuit 24 uses only on transistor and the current resonance circuit and the voltage resonance circuit are both provided on the primary side of the transformer T. The invention however is not limited to this but other type of switching inverter circuit may be employed. As a one-transistor type switching inverter circuit, circuits shown in FIGS. 10 to 13 can be conceived and any of these circuits may be employed in the present invention.

Figure 10:
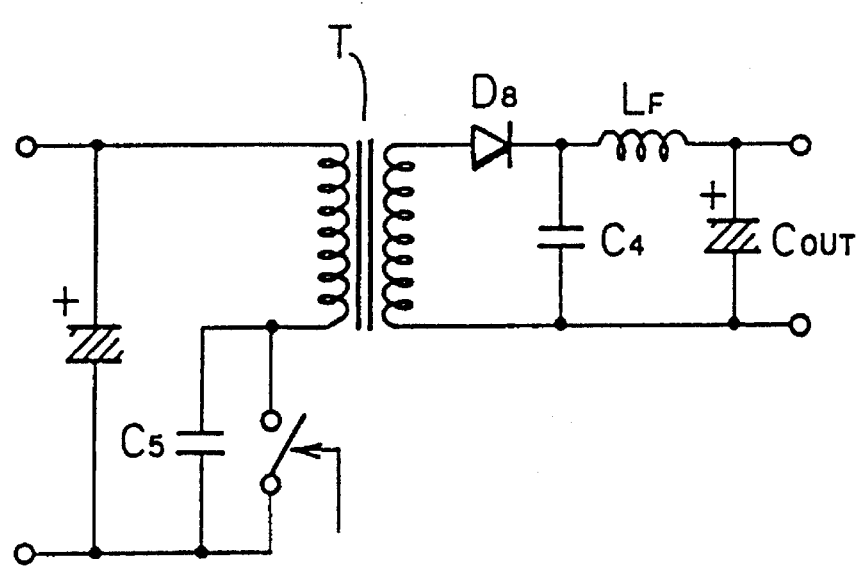
FIG. 10 is a diagram showing an example of a primary-side voltage resonance, secondary-side current resonance, one-transistor switching inverter.
Figure 11:
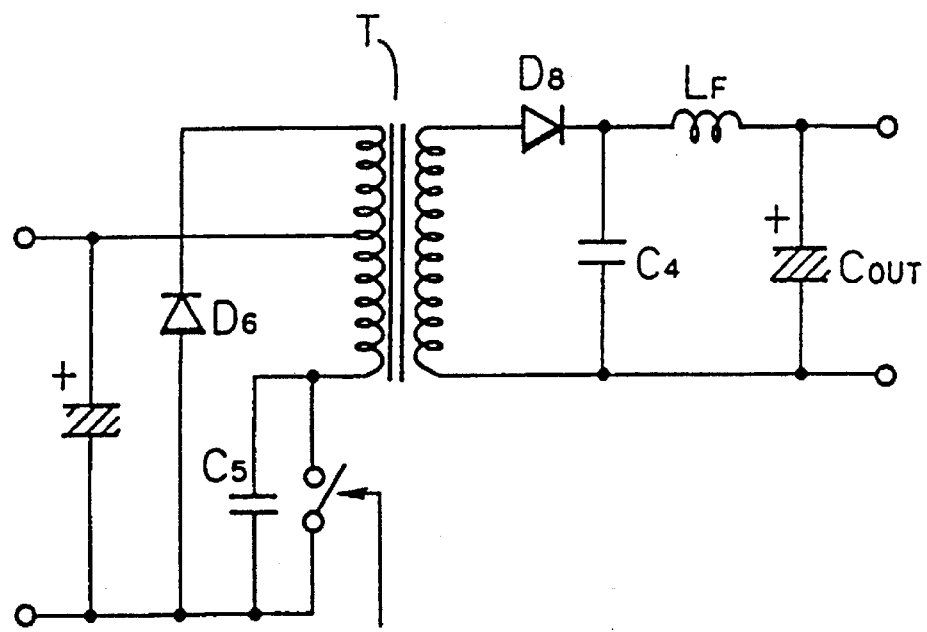
FIG. 11 is a diagram showing another example of a primary-side voltage resonance, secondary-side current resonance, one-transistor switching inverter.

FIG. 10 shows a circuit in which a voltage resonance circuit is constructed on the primary side by a capacitor C5 and self inductance of the primary winding side of the transformer and a current resonance circuit is constructed on the secondary side by the leakage inductance of the transformer and a capacitor C4. In this case, an interference preventing and smoothing inductance element LF is provided on the secondary side. FIG. 11 is a circuit which uses the circuit of FIG. 10 as its basic circuit and further includes a clamping diode D6 on the primary side.

Figure 12:
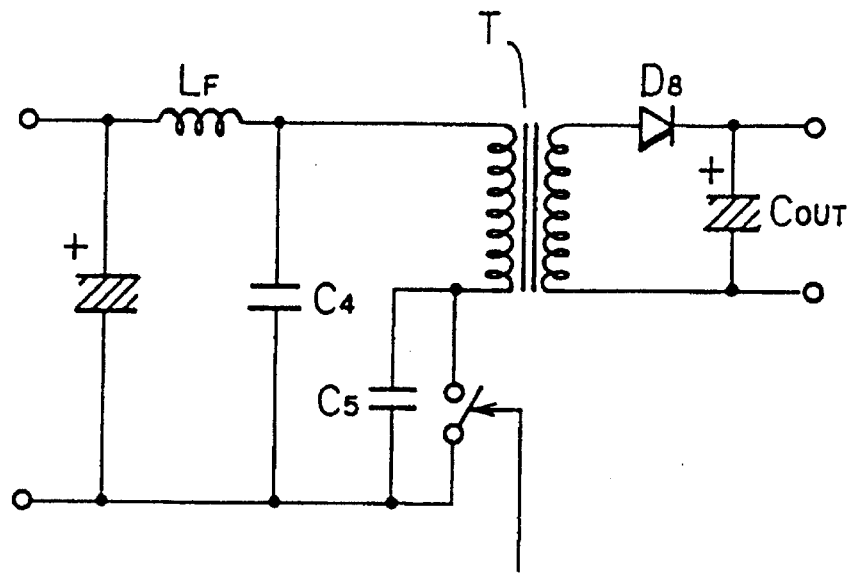
FIG. 12 is a diagram showing an example of a primary-side voltage resonance, primary-side current resonance, one-transistor switching inverter.
Figure 13:
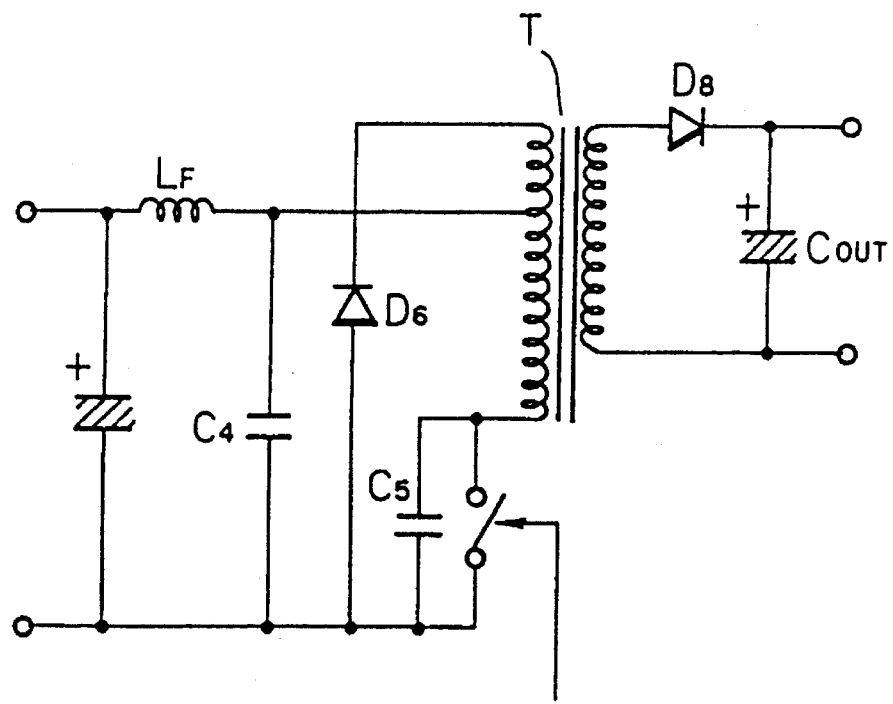
FIG. 13 is a diagram showing another example of a primary-side voltage resonance, primary-side current resonance, one-transistor switching inverter.

FIG. 12 shows a circuit in which both the current resonance circuit and voltage resonance circuit are provided on the primary side of the transformer T. In this case, an interference preventing inductance element LF is provided on the primary side. FIG. 13 shows a circuit which employs the circuit of FIG. 12 as its basic circuit and further includes a clamping diode D6 on the primary side. In the embodiment of FIG. 2, inductance component exists in output impedance of the former stage converter due to the first inductance element and therefore the first inductance element is used also as an interference preventing element. In the circuit of FIG. 12 likewise, use of an inductance element commonly for an interference preventing inductance element is possible.

The clamping diode D6 provided on the primary side of the transformer of the switching inverter circuit 24 in the embodiment of FIG. 2 performs a function of restraining peak voltage which is determined by voltage resonance. This has the following two meanings:

First, if there is no element that restrains the peak voltage, component elements of the circuit may sometimes be damage due to irregularity in the component elements or an error in design. By the provision of the clamping diode, such damage will be prevented and reliability of the circuit will be improved.

Figure 14A:
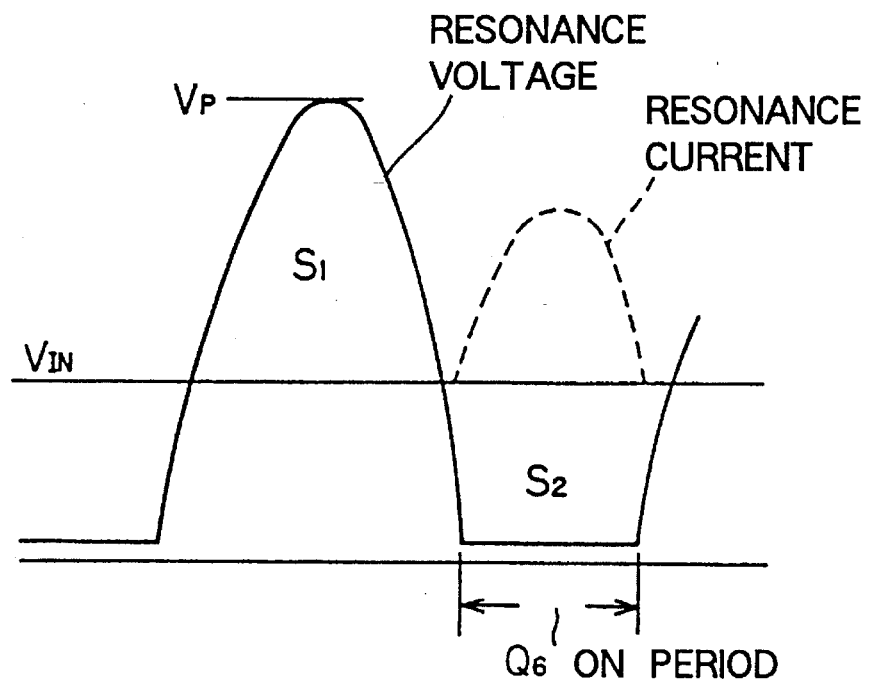
FIGS. 14A and 14B are diagrams for explaining a voltage clamp effect.
Figure 14B:
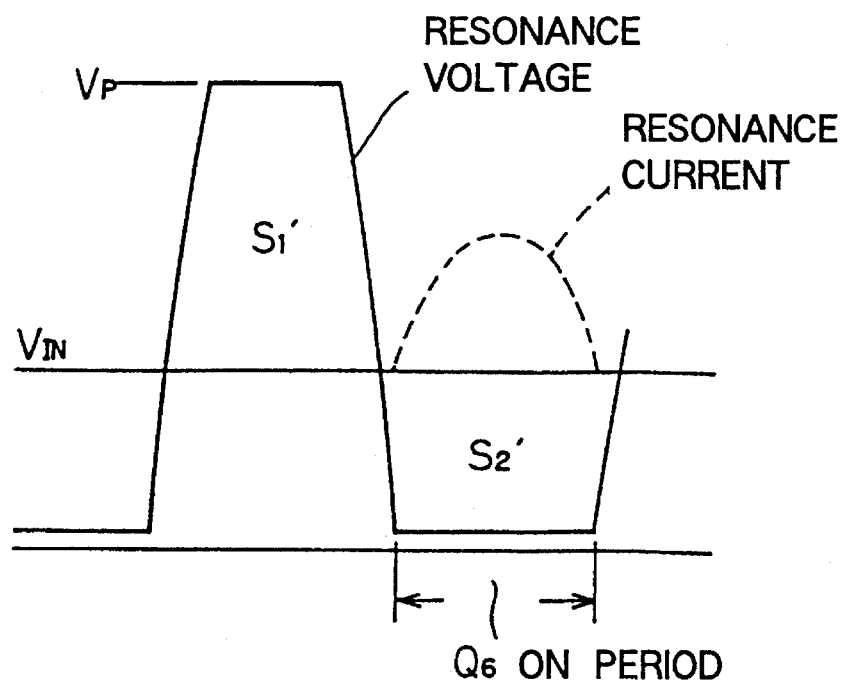

Second, the on period of the transistor Q6 can be relatively extended. As shown in FIGS. 14A and 14B in comparison, in the case of FIG. 14A which shows a state in which peak voltage Vp is not restrained, it is difficult to increase the ratio of the on period despite the large peak voltage. In contrast, in the case where the peak voltage Vp is determined by clamping as shown in FIG. 14B, the on period of the transistor Q6 can be extended. This is because areas of a positive half wave and a negative half wave of a resonance current waveform are the same, i.e., S1=S2 in FIG. 14A and S1'=S2' in FIG. 14B. Comparing the area S1 in the case of the peak value Vp in a sinusoidal wave with the area S1' in the case of the peak value Vp in the clamped waveform, S1' becomes larger than S1 and therefore S2' becomes larger than S2. Since the on period of the transistor Q6 can be extended, the peak of the resonance current can be made small.

The invention is applicable also to a two-transistor type switching inverter circuit using two switching elements. This type of switching inverter circuit is shown in FIGS. 15 to 17.

Figure 15:
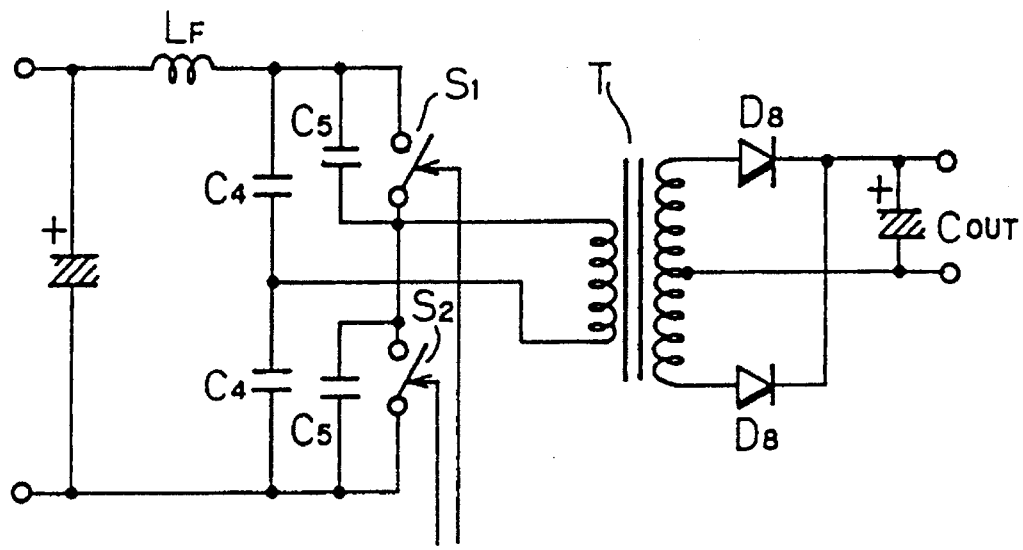
FIG. 15 is a diagram showing an example of a primary-side voltage resonance, primary side current resonance, two-transistor half-bridge type switching inverter.
Figure 16:
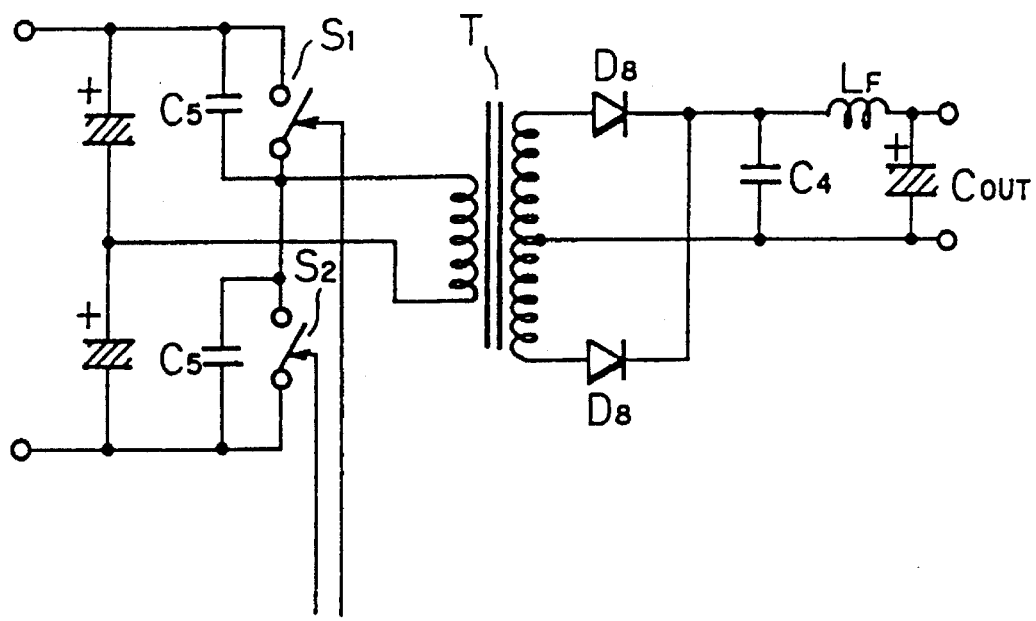
FIG. 16 is a diagram showing an example of a primary-side voltage resonance, secondary-side current resonance, two-transistor half-bridge type switching inverter.

FIG. 15 shows a switching inverter circuit of a half-bridge type in which two switching elements S1 and S2 are used and a current resonance capacitor C4 and a voltage resonance capacitor C5 are both provided on the primary side of a transformer T. FIG. 16 shows a switching inverter circuit which uses the circuit of FIG. 15 as its basic circuit and in which the current resonance capacitor C4 is provided on the secondary side of the transformer T.

Figure 17:
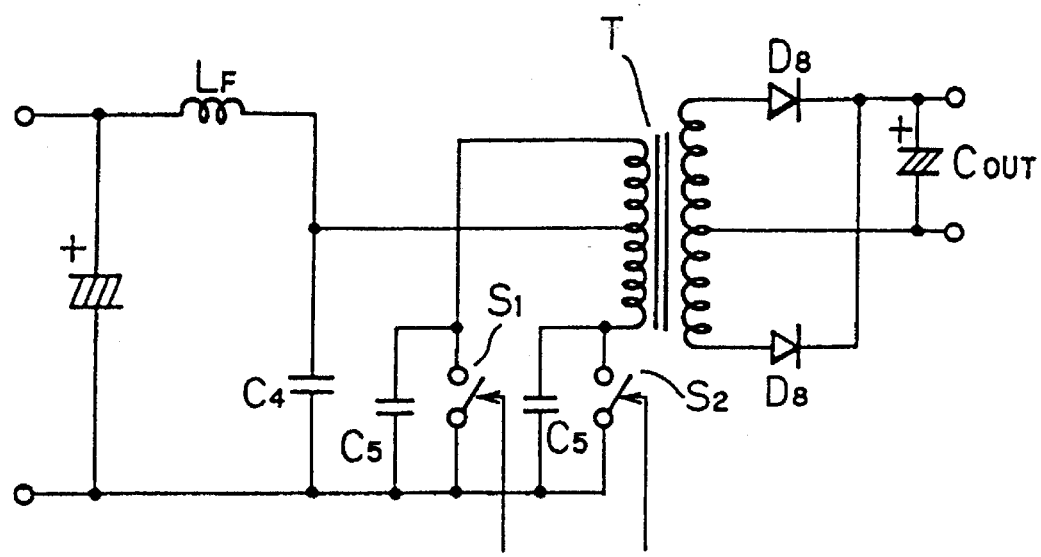
FIG. 17 is a diagram showing an example of a primary-side voltage resonance, primary-side current resonance, two-transistor push-pull type switching inverter.
Figure 18:
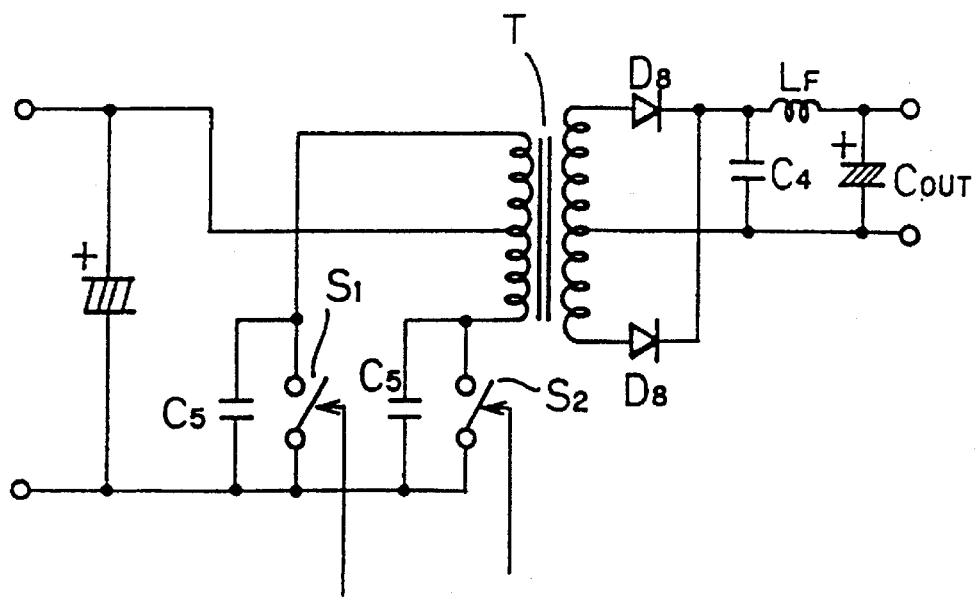
FIG. 18 is a diagram showing an example of a primary-side voltage resonance, secondary-side current resonance, two-transistor push-pull type switching inverter.

FIG. 17 shows a push-pull type switching inverter circuit in which both the voltage resonance circuit and the current resonance circuit are provided on the primary side. FIG. 18 is a push-pull type switching inverter circuit in which the current resonance circuit is provided on the secondary side.

In a case where the circuit of FIG. 15 or 17 having the current resonance circuit provided on the primary side is used in the embodiment of the invention, an interference preventing inductance element LF as described in the foregoing embodiment can be used commonly as the former stage inductance element.

Some modified examples of the timing control circuit 27 and the second starting circuit 26 in the switching inverter circuit 24 of the embodiment of FIG. 2 will be described.

Figure 19:
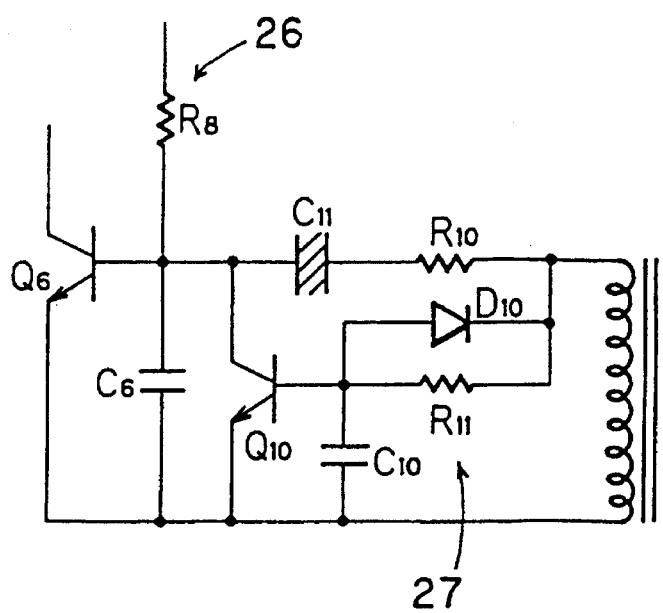
FIG. 19 is a diagram showing a modified example of a timing control circuit.

FIG. 19 shows an example in which the timing control circuit driving the transistor Q6 is composed of a transistor Q10, resistance R10 and R11, capacitors C10 and C11 and a diode D10.

Figure 20:
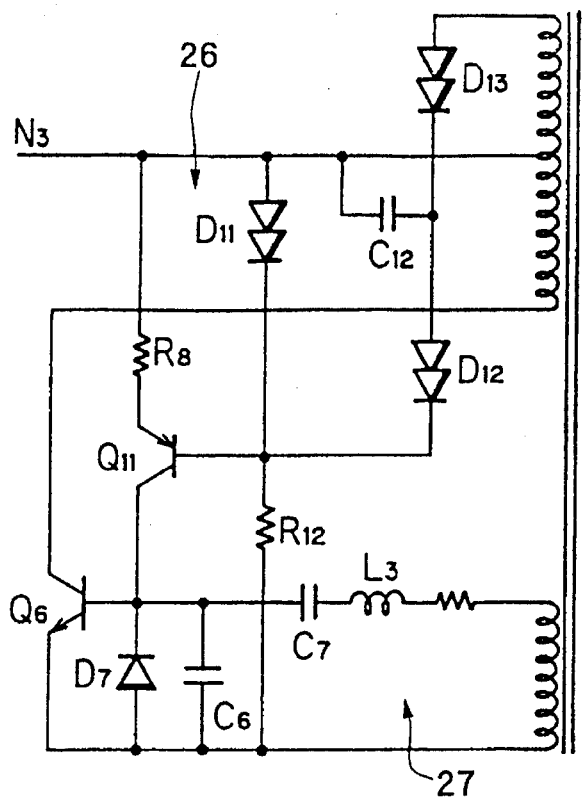
FIG. 20 is a diagram showing a modified example of a second starting circuit.

FIG. 20 is a modified example of the second starting circuit 26. In the embodiment of FIG. 2, the second starting circuit 26 is made of resistance R8 only. In the modified example, a PNP transistor Q11 is added and a bias circuit consisting of diodes D11, D12 and D13, resistance R12 and a capacitor C12 is provided for imparting a predetermined bias to the transistor Q11. When the former stage DC—DC converter has been started and the potential at the terminal N3 has risen to a predetermined value, the PNP transistor Q11 is turned on and thereby starts the switching inverter circuit by supplying a large base current to the transistor Q6 which is the switching element of the switching inverter circuit. In other words, starting is strengthened. Upon entering a stabilized state, the PNP transistor Q11 is turned off by the voltage of the capacitor C12 and the second starting circuit 26 thereby stops its function. By this arrangement, generation of heat in the starting resistance which would otherwise occur by strengthening starting by increasing the base current is restrained.

Figure 21:
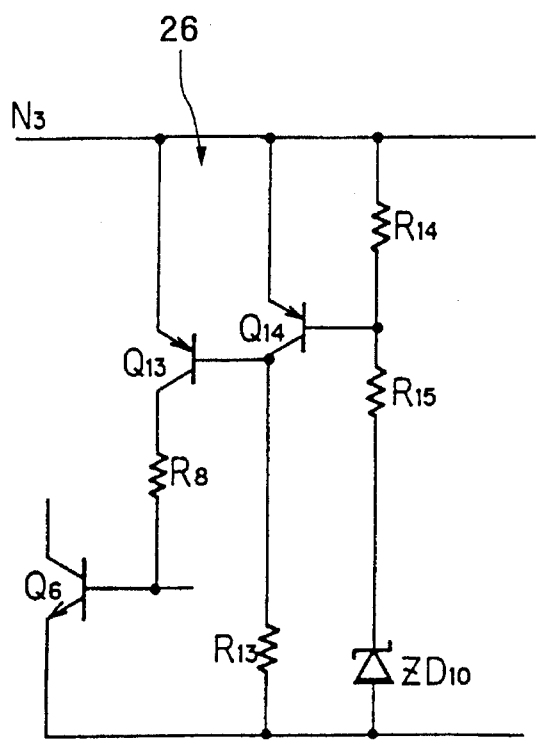
FIG. 21 is a diagram showing another modified example of a second starting circuit.

FIG. 21 shows another modified example of the second starting circuit 26. In this example, a bias circuit is made of two PNP transistors Q13 and Q14, resistances R13, R14 and R15 and a Zener diode ZD10. In this case, when the potential at the terminal N3 has risen to a predetermined value, a PNP transistor Q13 is turned on to supply base current to the transistor Q6. As the potential at the terminal N3 rises further, a PNP transistor Q14 is turned on and a forward bias of the transistor Q13 decreases so that the base current supplied to the transistor Q6 is restrained. In other words, the base current supplied to the transistor Q6 is restrained in accordance with input voltage and, in the same manner as in the example of FIG. 20, increase in heating due to strengthening of starting can be restrained.

What is claim is:

1. A power supply circuit of four-channel circuit type having an input terminal, an output terminal and a reference potential terminal comprising:

a first inductance, one end of which is connected to the input terminal;

a second inductance, one end of which is connected to the reference potential terminal;

a DC—DC converter circuit connected to the other end of the first inductance through an input side of the converter circuit and connected to the other end of the second inductance through a reference potential side thereof;

a switching inverter circuit connected to the output of said DC—DC converter circuit, said switching inverter circuit comprising:

switching means including switching elements capable of switching an input from the DC—DC converter to convert the input to ac and outputting ac from an output terminal thereof, the ac changing between two different potential;

series resonance means provided in series to current flowing from the output terminal of the switching means, the series resonance means being capable of generating resonance current;

parallel resonance means provided in parallel to voltage produced at the output terminal of the switching means, the parallel resonance means being capable of generating resonance voltage and potential at the output terminal of the switching means being converted from one of the two different potentials to the other by using the parallel resonance voltage of the parallel resonance means; and switching control means for controlling the switching elements of the switching means so as to intermittently turn on the switching elements; and dc output means for rectifying and smoothing an output of said switching inverter circuit, the dc output means being capable of taking out a dc output from the resonance current of the series resonance means, whereby all switching operations of the switching elements of the switching means are performed substantially at a voltage zero state or substantially at a current zero state and harmonic contents in operation voltage and operation current in the power supply circuit are reduced.

2. A power supply circuit of four-channel circuit type having an input terminal, an output terminal and a reference potential terminal comprising:

a first inductance, one end of which is connected to the input terminal;

a second inductance, one end of which is connected to the reference potential terminal;

a DC—DC converter circuit connected to the other end of the first inductance through an input side of the converter circuit and connected to the other end of the second inductance through a reference potential side thereof;

a switching inverter circuit connected to the output of said DC—DC converter circuit, said switching inverter circuit comprising:

switching means including switching elements capable of switching an input from the DC—DC converter to convert the input to ac and outputting ac from an output terminal thereof, the ac changing between two different potentials;

series resonance means provided in series to current flowing from the output terminal of the switching means, the series resonance means being capable of generating resonance current;

parallel resonance means provided in parallel to voltage produced at the output terminal of the switching means, the parallel resonance means being capable of generating resonance voltage and potential at the output terminal of the switching means being converted from one of the two different potentials to the other by using the parallel resonance voltage of the parallel resonance means; and switching control means for controlling the switching elements of the switching means so as to intermittently turn on the switching elements; and dc output means for rectifying and smoothing an output of said switching inverter circuit, the dc output means being capable of taking out a dc output from the resonance current of the series resonance means, whereby all switching operations of the switching elements of the switching means are performed substantially at a voltage zero state or substantially at a current zero state and harmonic contents in operation voltage and operation current in the power supply circuit are reduced;

wherein said DC—DC converter circuit comprises a capacitor, a diode connected in series to the capacitor and a switching element connected in parallel to the series circuit of the capacitor and the diode, the connecting end of the capacitor and the switching element being an input side of said DC—DC converter circuit, the connecting end of the capacitor and the diode being a reference potential side of said DC—DC converter circuit, and the connecting end of the diode and the switching element being an output side of said DC—DC converter circuit.

3. A power supply circuit as defined in claim 1 wherein said DC—DC converter circuit comprises a switching element, a capacitor connected in series to the switching element and a diode connected in parallel to the series circuit of the switching diode and the capacitor, the connecting end of the switching element and the diode being an input side of said DC—DC converter circuit, the connecting end of the switching element and the capacitor being a reference potential side of said DC—DC converter circuit and the connecting end of the capacitor and the diode being an output side of said DC—DC converter circuit.

4. A power supply circuit as defined in claim 1 wherein said DC—DC converter circuit comprises a switching element, a diode connected in series to the switching element and a capacitor connected in parallel to the series circuit of the switching circuit and the diode, the connecting end of the switching element and the capacitor being an input side of said DC—DC converter circuit, the connecting end of the switching element and the diode being a reference potential side of said DC—DC converter circuit and the connecting end of the diode and the capacitor being an output side of said DC—DC converter circuit.

5. A power supply circuit of four-channel circuit type having an input terminal, an output terminal and a reference potential terminal comprising:

a first inductance, one end of which is connected to the output terminal;

a second inductance, one end of which is connected to the reference potential terminal;

a DC—DC converter circuit connected to the other end of the first inductance through an input side of the converter circuit and connected to the other end of the second inductance through a reference potential side thereof;

a switching inverter circuit connected to the output of said DC—DC converter circuit, said switching inverter circuit comprising:

switching means including switching elements capable of switching an input from the DC—DC converter to convert the input to ac and outputting ac from an output terminal thereof, the ac changing between two different potentials;

series resonance means provided in series to current flowing from the output terminal of the switching means, the series resonance means being capable of generating resonance current;

parallel resonance means provided in parallel to voltage produced at the output terminal of the switching means, the parallel resonance means being capable of generating resonance voltage and potential at the output terminal of the switching means being converted from one of the two different potentials to the other by using the parallel resonance voltage of the parallel resonance means; and switching control means for controlling the switching elements of the switching means so as to intermittently turn on the switching elements; and dc output means for rectifying and smoothing an output of said switching inverter circuit, the dc output means being capable of taking out a dc output from the resonance current of the series resonance means, whereby all switching operations of the switching elements of the switching means are performed substantially at a voltage zero state or substantially at a current zero state and harmonic contents in operation voltage and operation current in the power supply circuit are reduced.

6. A power supply circuit of four-channel circuit type having an input terminal, an output terminal and a reference potential terminal comprising:

a first inductance, one end of which is connected to the output terminal;

a second inductance, one end of which is connected to the reference potential terminal;

a DC—DC converter circuit connected to the other end of the first inductance through an input side of the converter circuit and connected to the other end of the second inductance through a reference potential side thereof;

a switching inverter circuit connected to the output of said DC—DC converter circuit, said switching inverter circuit comprising:

switching means including switching elements capable of switching an input from the DC—DC converter to convert the input to ac and outputting ac from an output terminal thereof, the ac changing between two different potentials;

series resonance means provided in series to current flowing from the output terminal of the switching means, the series resonance means being capable of generating resonance current;

parallel resonance means provided in parallel to voltage produced at the output terminal of the switching means, the parallel resonance means being capable of generating resonance voltage and potential at the output terminal of the switching means being converted from one of the two different potentials to the other by using the parallel resonance voltage of the parallel resonance means; and switching control means for controlling the switching elements of the switching means so as to intermittently turn on the switching elements; and dc output means for rectifying and smoothing an output of said switching inverter circuit, the dc output means being capable of taking out a dc output from the resonance current of the series resonance means, whereby all switching operations of the switching elements of the switching means are performed substantially at a voltage zero state or substantially at a current zero state and harmonic contents in operation voltage and operation current in the power supply circuit are reduced;

wherein said DC—DC converter circuit comprises a capacitor, a diode connected in series to the capacitor and a switching element connected in parallel to the series circuit of the capacitor and the diode, the connecting end of the capacitor and the switching element being an input side of said DC—DC converter circuit, the connecting end of the capacitor and the diode being a reference potential side of said DC—DC converter circuit, and the connecting end of the diode and the switching element being an output side of said DC—DC converter circuit.

7. A power supply circuit as defined in claim 5 wherein said DC—DC converter circuit comprises a switching element, a capacitor connected in series to the switching element and a diode connected in parallel to the series circuit of the switching diode and the capacitor, the connecting end of the switching element and the diode being an input side of said DC—DC converter circuit, the connecting end of the switching element and the capacitor being a reference potential side of said DC'DC converter circuit and the connecting end of the capacitor and the diode being an output side of said DC—DC converter circuit.

8. A power supply circuit as defined in claim 5 wherein said DC—DC converter circuit comprises a switching element, a diode connected in series to the switching element and a capacitor connected in parallel to the series circuit of the switching circuit and the diode, the connecting end of the switching element and the capacitor being an input side of said DC—DC converter circuit, the connecting end of the switching element and the diode being a reference potential side of said DC—DC converter circuit and the connecting end of the diode and the capacitor being an output side of said DC—DC converter circuit.

* * * * *